United States Patent [19]

Stout

[11] 3,898,091

[45] Aug. 5, 1975

[54] NOVEL GLAZING COMPOSITION AND METHOD

[75] Inventor: Joseph V. Stout, Point Pleasant, N.J.

[73] Assignee: M & T Chemicals Inc., Greenwich, Conn.

[22] Filed: June 4, 1973

[21] Appl. No.: 366,540

[52] U.S. Cl. .................................. 106/48; 106/49
[51] Int. Cl.² .......................................... C03C 5/02
[58] Field of Search ............................. 106/48, 49

[56] References Cited
UNITED STATES PATENTS

| | | | |
|---|---|---|---|
| 2,508,735 | 5/1950 | Van Horn | 106/48 |
| 2,695,249 | 11/1954 | Sweo et al. | 106/48 X |
| 2,772,187 | 11/1956 | Katz et al. | 106/48 X |
| 2,823,138 | 2/1958 | Hoffman | 106/48 X |
| 2,892,734 | 6/1959 | Hoffman | 106/48 X |
| 2,950,209 | 8/1960 | Hoffman | 106/48 X |

*Primary Examiner*—Patrick P. Garvin
*Assistant Examiner*—John F. Niebling
*Attorney, Agent, or Firm*—Robert P. Auber; Kenneth G. Wheeless; Robert Spector

[57] ABSTRACT

Ceramic glaze formulations incorporating surfactants exhibit an increased resistance to "crawling" during firing and in the presence of surface defects which may be present on ceramic objects coated with the glaze.

2 Claims, No Drawings

NOVEL GLAZING COMPOSITION AND METHOD

BACKGROUND OF THE INVENTION

This invention relates to a method for glazing ceramic bodies, particularly those exhibiting surface defects. The invention further relates to glaze compositions which exhibit improved leveling, coverage, and a resistance to the phenomenon known as crawling.

Ceramic products of the type commonly referred to as claywares are shaped using a number of well known techniques, including jiggering on a potter's wheel, casting, extrusion and dry pressing. The resultant objects often exhibit surface defects or irregularities which can occur during the shaping or drying operations or during transfer of the shaped article from one processing step to the next. These irregularities may also be due to the presence of impurities or an uneven particle size distribution in the oxides and other raw materials from which the ceramic article is formed. Following the drying operation the clayware articles are often coated with a glaze to improve the appearance and strength of the fired product, after which the article is fired at temperatures that are usually between 850° and 1400°C., depending upon the type of glaze and degree of refractoriness desired in the fired product. Alternatively, the article may be subjected to a two-stage firing, with the glaze being applied between the first and second firing steps. The presence of surface defects on the ceramic body may cause discontinuities to appear in the molten glaze coating during firing. Once a discontinuity appears, a phenomenon known as glaze "crawling" often occurs during which any discontinuities in the glaze widen to the extent that the appearance and usefulness of the final article is impaired. In order to correct this defect in the fired article the discontinuity and the area immediately surrounding it must be sanded or otherwise refinished, reglazed and fired again, a time-consuming and costly procedure.

It has now been found that glaze defects caused by surface irregularities in the ceramic body which result in crawling of the glaze can be significantly reduced or eliminated by incorporating into the glaze formation one or more of the class of compounds known as surfactants of the cationic, anionic, nonionic or amphoteric types. Preferably the surfactant is incorporated into the formulation as a coating on all or a portion of the solid phase of the aqueous glaze dispersion or "slip." The coating is conveniently applied by placing the solid particles in an aqueous solution of the surfactant, draining off the excess solution, and drying the particles to remove the water.

SUMMARY OF THE INVENTION

This invention provides improved glaze compositions comprising an aqueous dispersion of silica and at least one compound selected from the group consisting of silicates and oxides of aluminum, alkali metals, alkaline earth metals, zinc, lead and magnesium. The improvement comprises the presence in said composition of between 0.01 and 10%, preferably between 0.1 and 1%, based on the weight of said glaze composition, of a compound selected from the group consisting of cationic, anionic, non-ionic and amphoteric surfactants.

DETAILED DESCRIPTION OF THE INVENTION
SUITABLE SURFACTANTS

A variety of surfactants can be incorporated into the present glaze formulations. The only requirement is that the surfactant be sufficiently soluble in water to achieve the concentration level required in the formulation and that the resultant solution exhibit a viscosity suitable for the desired method of application. Surfactants are generally grouped into two major categories, ionic and non-ionic, each of which is suitable for use in the present glaze formulations.

The molecules of most surface active agents are characterized by an elongated portion of relatively low hydrophilicity with one end of the molecule having a highly hydrophylic radical exhibiting strong residual or secondary valence forces. Ionic surface active agents are distinguished from the non-ionic types by the presence of an end group radical which is ionizable in aqueous solution. The resultant elongated hydrophobic segment of the molecule is negatively charged (anionic type), positively charged (cationic type), or may exist as a zwitterion (amphoteric type).

The most widely used types of anionic surfactants are the alkali metal and alkaline earth metal salts of carboxylic acids and sulfonic acids, half esters of sulfuric acid and reaction products of sulfuric acid with compounds containing one or more carbon-carbon double bonds.

The cationic type of surfactant is represented by salts of amines and quaternary ammonium compounds. Two of the widely used members of this class are octadecyl ammonium chloride ($Cl_8H_{37}NH_3^+Cl^-$) and the mixed trialkyl benzyl ammonium halides. Phosphonium and sulfonium compounds can also be employed as cationic surfactants.

The class of ampholytic surfactants contain both basic and acidic groups on the same molecule. Amino acids, betaines, and derivatives of a sulfonic or sulfuric acid containing amine groups are representative of this class of compounds.

Non-ionic surfactants do not contain an ionizable radical. One of the most widely used subclasses of non-ionic compounds are the reaction products of olefin oxides with hydrophobic hydroxyl-containing compounds, including mono- and polyhydroxy alkanols and phenols. The water solubility of the reaction product is directly proportional to the number of olefin oxide residues present on the molecule. The hydroxy compound can be replaced by a carboxylic acid or hydroxy acid and the olefin oxide by a polymer thereof, i.e., a polyalkylene glycol such as polyethylene glycol. One class of commercially available surfactants is prepared by reacting fatty acid monoesters of anhydrosorbitals with ethylene oxide. Low molecular weight condensation products derived from polyhydroxy alcohols and water-soluble dicarboxylic acids are also available, as are reaction products of diethanolamine with fatty acids such as those derived from the saponification of coconut oil.

The various types of surfactants suitable for use in the glaze formulations of this invention can be summarized as follows:

1. ANIONIC SURFACTANTS
   A. Carboxylic Acid Salts
      1. Carboxyl radical joined directly to the hydrophobic group (subclassification made on basis of the type of hydrophobic group, e.g., fatty acid soaps, resin soaps, etc.).
  2. Carboxyl radical joined through an intermediate linkage.
     a. Amide group as intermediate link.
     b. Ester group as intermediate link.
     c. Sulfonamide group as intermediate link.
     d. Miscellaneous intermediate links, including ether, —$SO_2$—, —S—, etc.
B. Sulfuric Acid Esters (Sulfates)
  1. Sulfate joined directly to hydrophobic group
     a. Hydrophobic group contains no other polar structures (sulfated alcohol and sulfated olefin type).
     b. Sulfuric esters with hydrophobic groups containing other polar structures (sulfated oil type).
  2. Sulfate group joined through intermediate linkage.
     a. Ester linkage.
     b. Amide linkage.
     c. Either linkage.
     d. Miscellaneous linkages, including oxyalkylimidazole sulfates.
C. Alkane Sulfonic Acids
  1. Sulfonic group directly linked to ohydrophobic group.
     a. Hydrophobic group bears other polar substituents ("highly sulfated oil" type). Chlro, hydroxy, acetoxy, and olefin sulfonic acids.
     b. Unsubstituted alkane sulfonic acids (cetane sulfo acid type).
     c. Miscellaneous sulfonic acids of uncertain structure, e.g., oxidation products of sulfurized olefins, sulfonated rosin, etc.
  2. Sulfonic groups joined through intermediate linkage.
     a. Ester linkage 1. RCOO—R'—$SO_3H$ 2. ROOC—R'—$SO_3H$ (sulfoacetate type).
     b. Amide linkage 1. RCONH—R'—$SO_3H$ 2. RNHOC—R'—$SO_3H$ (sulfosuccinamide type).
     c. Ether linkage
D. Alkyl Aromatic Sulfonic Acids
  1. Hydrophobic group joined directly to sulfonated aromatic nucleus (subclasses on basis of nature of hydrophobic group, e.g., alkyl phenols, terpene, resin-aromatic condensates, alkyl aromatic ketones, etc.)
  2. Hydrophobic group joined to sulfonated aromatic nucleus through an intermediate linkage.
     a. Ester linkage (sulfophthalates, sulfobenzoates)
     b. Amide and imide linkages. 1. R—COH-N—Ar$SO_3H$ type. 2. Sulfobenzamide type.
     c. Ether linkage (alkyl phenyl ether type).
E. Miscellaneous Anionic Hydrophilic Groups
  1. Phosphates and phosphonic acids.
  2. Persulfates and thiosulfates.
  3. Sulfonamides.
  4. Sulfamic acids.
II. CATIONIC SURFACTANTS
  A. Amine Salts (Primary, Secondary and Tertiary Amines)
    1. Amino group joined directly to hydrophobic group.
       a. Aliphatic and aromatic amino groups.
       b. Amino group is part of a heterocyclic structure.
    2. Amino group joined to hydrophobic group through an intermediate link.
       a. Ester link.
       b. Amide link.
       c. Ether link.
  B. Quaternary Ammonium Compounds
    1. Nitrogen joined directly to hydrophobic group.
    2. Nitrogen joined to hydrophobic group through an intermediate link.
       a. Ester link.
       b. Amide link.
       c. Ether link.
  C. Other Nigrogenous Bases
    1. Non-quaternary bases(including guanidine, and thiuronium salts).
    2. Quaternary bases.
  D. Non-nitrogenous Bases
    1. Phosphonium compounds
    2. Sulfonium compounds and other "onium" compounds.
III. NON-IONIC SURFACTANTS
  A. Ether Linkage to Solubilizing Groups.
  B. Ester Linkage to Solubilizing Groups.
  C. Amide Linkage to Solubilizing Groups.
  D. Multiple Linkages to Solubiling Groups.
IV AMPHOTERIC SURFACTANTS
  A. Contain Amino and Carboxy Radicals
    1. Non-quaternary.
    2. Quaternay.
  B. Contain Amino and Sulfuric Ester Radicals
    1. Non-quaternary.
    2. Quaternary.
  C. Amino and Alkane Sulfonic Acid.
  D. Amino and Aromatic Sulfonic Acid.
  E. Miscellaneous Combinations of Basic and Acidic Groups.

"R" in the foregoing summary represents an alkyl radical containing between 1 and 20 carbon atoms, R' represents an alkylene radical containing between 1 and 20 carbon atoms and Ar represents an arylene radical.

TYPES OF GLAZES

Glazes are essentially glasses, and many have chemical compositions resembling those of commercial soda-lime-silica glasses, but contain relatively more alumina than most glasses. Like glasses, they are often defined as supercooled liquids in that they are amorphous and usually must remain so to serve their primary function. The glazes used on various types of whiteware products are fired at quite different temperatures, ranging all the way from Cone 010 (890°C.) for certain art objects up to Cone 18 (1500°C.) or higher for certain electrical porcelains. The firing temperature range is prefereably between Cones 4 and 12, a spread of 260°F.

A glaze may be clear or opaque, colored or colorless, non-crystalline or crystalline, lead or leadless, raw or fritted. The terms "raw" and "fritted" refer to the method of preparing the glaze batch. All glazes are applied in the form of aqueous dispersions and the ingredients must therefore be insoluble in water. If it is desired to use certain raw materials such as boric acid which are soluble, these must be mixed with silicaa, with or without alumina, then sintered or malted to form insoluble silicates and subsequently quenched to facilitate grinding. This process is known as fritting.

GLAZE MATERIALS

A great number of raw materials are used in the compounding of ceramic glazes, including flint, feldspar, kaolin and lime. The raw materials can be arranged into groups, based on the oxide each adds to the fired glaze.

Silica ($SiO_2$) is a component of practically every glaze. Pulverized flint is the usual source of silica for glazes, though the feldspar present in some compositions may make the addition of free silica unnecessary. A high silica content increases the durability, hardness and maturing temperature of a glaze.

Boric oxide ($B_2O_3$) acts as a glass former and is frequently used as an acidic constituent of glazes. It may be introduced either as borax ($Na_2B_4O_7 \cdot 10H_2O$), which contains water of crystallization amounting nto 47.2% by weight, or in the dehydrated form. Borax is water-soluble and therefore must be fritted for use in glazes. The same is true for boric acid ($B_2O_3 \cdot 3H_2O$), which is often used when the soda content of natural borax would be objectionably high. Still another source of boric oxide is the mineral colemanite ($2CaO \cdot 3B_2O_3 \cdot 5H_2O$), which is practically insoluble and therefore very useful when raw, i.e., non-fritted, glazes are desired. $B_2O_3$ has an important function as a flux in addition to reducing the viscosity of molten glazes and promoting a high gloss.

Sodium Oxide ($Na_2O$) and potassium oxide ($K_2O$) are the fluxes most often used in whiteware glazes. $K_2O$ is the more commonly used, and is usually added in the form of potash feldspar, which also supplies alumina and silica. Potash produces a more brilliant glaze than soda and gives a slightly greater firing range. Soda is a somewhat more powerful flux and therefore yields a more fluid melt. It may be added as soda feldspar, borax, sodium carbonate or sodium nitrate. Sodium glazes are usually less resistant to solution by water than the corresponding potash glazes. To a certain extent, either sodium or potassium oxides may be used to regulate the expansion of a glaze.

Calcium oxide (CaO) is one of the chief fluxes of medium- to high-temperature glazes and also reduces the melt viscosity, particularly for glazes high in silica. Lime also promotes adhesion of the glaze to the ceramic body, as it reacts with both body and glaze. Lime may be added as pure calcium carbonate, burned lime, whiting, chalk or limestone. Other materials, including fluorspar ($CaF_2$), calium phosphate, or colemanite, may also be used as a source of lime, but they are not added to the batch solely because of their lime content. When added in the form of colemanite, the lime content of some glazes may be safely increased to a higher total than is possible when whiting is used. Lime contributes stability, hardness and toughness to the glaze when used in proper amounts. Too high a lime content will cause devitrification and produce a mat finish on the glaze.

Aluminum oxide ($Al_2O_2$) is a constituent of practically every type of glaze used in the whitewares industry. Possessing the ability of reacting as either an acid or base, it can combine with silica or the basic oxides, and is widely used as the means by which to regulate the relative oxygen content, thereby preventing devitrification. The ratio between alumina and silica is used by the ceramist as an indication of the suitability of a glaze. For bright glossy glazes, the alumina to silica ratio usually varies between 1:6 and 1:10, for mat glazes it is between 1:3 and 1:4. Normally introduced by means of a feldspar, clay, or Cornwall stone, alumina has a greater effect on the durability of a glaze than any other single oxide. It increases the refractoriness of glazes, improves the strength, lowers the thermal expansion, adds to the hardness and brilliance and, in some cases, improves the opacity.

Barium oxide (BaO) is normally added to glazes as barium carbonate, and is used as a flux or to aid in the formation of a mat, i.e., non-glossy finish. If the BaO content exceeds about 0.3 equivalent, barium takes the role of a refractory rather than a flux, and increases the melting temperature of the glaze. When used in small amounts, it improves the gloss and mechanical strength, and enhances resistance to organic acids. In some types of glazes, BaO tends to promote crazing, and it has a harmful effect on certain colors. In the form of barium carbonate it is toxic and must be handled with great care.

Strontium oxide (SrO), like barium, may be added in carbonate form. It appears to offer all the advantages of barium in glazes, without the poisonous properties and the tendency of barium to cause defects when the ceramic is fired in a kiln atmosphere containing sulfur. Strontium extends the firing range of the high-lime glazes needed for certain colors and should improve glaze fit, hardness and decrease solubility when used to replace calcium or barium. It does, however, increase the thermal expansion coefficient of the glaze when substituted for either CaO, ZnO or PbO on a molecular basis.

Magnesium oxide (MgO), usually added as $MgCO_3$ or talc, exhibits the properties of a refractory material up to a relatively high temperature, at which point it becomes an active flux. In all respects it behaves similarly to lime, makes a glaze more fluid at high temperatures, aids in promoting matness, and tends to reduce crazing.

Lead oxide (PbO) is one of the most widely used fluxes for ceramic glazes. It may be introduced in three oxide forms —litharge (PbO), red lead ($Pb_3O_4$), and white lead ($2PbCO_3 \cdot Pb(OH)_2$). In addition, fritted lead silicates ($PbO \cdot SiO_2$ and $2PbO \cdot SiO_2$) are also available, making possible the use of lead in a much safer form. Lead has always been extremely popular for glaze use. It gives great brilliance, luster and smoothness in glazes which cover well, and its reactions with silica take place at relatively low temperatures. Lead oxide and silica may be the only ingredients present in a glaze for use in the medium-temperature range. Lead glazes are easy to use and are not as "tender" as other types, in that small irregularities in processing may not harm a lead glaze where they would make worthless a ware coated with a leadless glaze. Lead glazes are also suitable over a wide range of firing temperatures.

Zinc oxide (ZnO) is available in pure form, being manufactured from various zinc-bearing ores. It is used in many types of glazes as a flux and to prevent crazing. When used in conjunction with alumina it also improves the whiteness of opaque glazes. In moderate amounts, ZnO often improves the elasticity, lengthens the maturing range, and enhances the brilliance of colors. Increasing the ZnO content of a glaze will yield a mat finish in the fired glaze. If the glaze is supersaturated with ZnO, zinc silicates crystallize. Quick cooling "freezes" these crystals into the glaze, a method which is often used for the production of crystalline glazes. The size and distribution of the individual crystals may be controlled to a certain extent by regulation of the ratio between zinc and the alkalies present.

COLORING INGREDIENTS FOR GLAZES

The materials discussed in the foregoing section all produce silicate melts that are colorless and transparent. None of them, when pure, can be used to develop either color or opacity in ceramic glazes. As many glazes are used solely for decoration, color is extremely important, and the coloring oxides are fully as essential to the ceramic industry as the basic glaze materials just discussed. The oxides and other compounds which are conventionally employed to impart various colors to glazes are well known and a discussion of this subject is not required in this specification.

Some means of reflecting and diffracting light rays must be provided in order for opacity to be developed. Four different means may be used, singly or in combination, to cause opacity: (1) insoluble particles in the glaze, (2) crystallites, (3) immiscible constituents, (4) gas bubbles. Of these, the first is by far the most important. In each instance the ultimate aim is to provide a method of changing the index of refraction of a part of the fired glaze.

Opacity is usually developed by the introduction of such insoluble materials as tin, antimony, arsenic, zinc, titanium or zirconium oxides, or zirconium silicates. Zinc and titanium oxides are quite soluble in many glazes and therefore are not normally used as primary opacifiers, but only in conjunction with the stronger opacifying agents.

COMPOUNDING OF GLAZES

1. Low softening point glazes - Cone 010 to Cone 3. Used for art were semi-vitreous ware. Weight ratio of silica to RO group varies from 1.5 to 3.0.

2. Medium softening point glazes - Cone 3 to Cone 10. Used on vitreous china, sanitary ware, floor and wall tile, some types of art ware, stoneware. Empirical formula varies from $RO.0.5\ Al_2O_3.2.5\ SiO_2$ up to $RO.0.1\ Al_2O_3.5.0\ SiO_2$.

3. High softening point glazes - From Cone 10 up. Used for hard porcelain, chemical ware, steatite, some types of electrical porcelain and stoneware. Formula varies from $RO.0.5\ Al_2O_3.5\ SiO_2$ to very refractory glazes such as $RO.1.5\ Al_2O_3.14\ SiO_2$.

Note that in the above formulas the RO group is always unity. This group actually includes both the RO and $R_2O$ type oxides and in glaze calculations they are made to total 1.0 equivalent.

LOW-TEMPERATURE GLAZES

For the low-melting glazes, there usually is no $B_2O_3$ present, and the RO group consists primarily of $Na_2O$, $K_2O$ and PbO. Lead is the largest fluxing ingredient for compositions maturing as low as Cone 010, and is progressively replaced by the alkalies to increase the maturing temperature. This is illustrated in the following table which shows representative compositions of glazes in the low-softening group. Note that the silica content of the glaze is the primary single factor determining its refractoriness. A part of the silica content is often replaced on a molecular basis by $B_2O_3$ in these low-fusing glazes.

Compositions of Low-Fusing Glazes - in Equivalents

| Component | Fusion temperatures - cones | | | | | | |
|---|---|---|---|---|---|---|---|
| | 010 | 08 | 06 | 04 | 02 | 01 | 2 |
| PbO | 0.80 | 0.88 | 0.48 | 0.51 | 0.70 | — | — |
| $Na_2O$ | — | 0.06 | — | — | — | 0.32 | — |
| $K_2O$ | 0.10 | 0.06 | 0.09 | 0.12 | 0.20 | 0.18 | 0.20 |
| ZnO | — | — | — | 0.07 | — | — | 0.40 |
| CaO | 0.10 | — | 0.43 | 0.30 | 0.10 | 0.50 | 0.40 |
| Total RO | 1.00 | 1.00 | 1.00 | 1.00 | 1.00 | 1.00 | 1.00 |
| $Al_2O_3$ | 0.17 | 0.10 | 0.17 | 0.12 | 0.25 | 0.52 | 0.22 |
| $SiO_2$ | 1.00 | 1.30 | 1.13 | 1.33 | 1.60 | 2.40 | 2.55 |

In the more fusible glazes of this group, lead is an important constituent, while at the upper end of the range it may be displaced by zinc and lime. It is usually found that glazes with four or five different oxides in the RO group have a wider firing range, lower fusion point, and whiter color than those with only one or two RO group members.

In glazes of this group, PbO usually varies between 0.4 and 0.7 equivalent; higher amounts make the glaze very soft and readily affected by the kiln atmosphere. Lime ranges from 0.1 to 0.3 equivalent; an excess produces refractoriness, cloudiness, and scumming difficulties. The alkali ($Na_2O$ plus $K_2O$) content ranges from 0.15 to 0.30 equivalent; higher amounts increase the thermal coefficient so much that crazing is likely to develop. The alumina content usually varies from 0.10 to 0.35 equivalent; larger amounts make the glaze too refractory to maintain within this temperature range.

MEDIUM-TEMPERATURE GLAZES

Representative compositions of glazes in what have been referred to as the medium-temperature group are shown in the following table. Again it is noted thtat the principal difference between the glazes is the increasing silica content of the higher-melting compositions. Lead oxide is seen to be an important constituent of certain types of glazes within this range. Glazes for any maturing temperature whatever can be made without lead, and such leadless glazes are in common use.

The relative fluxing abilities of the various oxides can be summarized as follows, the higher numerals representing increasing tendency to function as a flux.

| Oxide | Fluxing ability |
| --- | --- |
| CaO | 1 |
| BaO | 1 |
| ZnO | 2 |
| K₂O | 2½ |
| Na₂O | 5 |
| PbO | 8 |

Compositions of Medium-Fusing Glazes - In Equivalents

| Component | Fusion Temperatures - cones | | | | | | | |
| --- | --- | --- | --- | --- | --- | --- | --- | --- |
|  | 3 | 4 | 5 | 6 | 7 | 8 | 9 | 10 |
| $Na_2O$ | — | 0.192 | 0.018 | — | — | — | 0.30 | — |
| $K_2O$ | — | 0.064 | 0.185 | 0.25 | 0.10 | 0.30 | 0.30 | 0.30 |
| CaO | 0.30 | 0.490 | 0.396 | 0.30 | 0.20 | 0.60 | 0.40 | 0.60 |
| ZnO | — | — | 0.145 | — | 0.20 | 0.10 | — | 0.10 |
| PbO | 0.70 | 0.250 | 0.256 | — | 0.50 | — | — | — |
| BaO | — | — | — | 0.45 | — | — | — | — |
| Total RO | 1.00 | 1.000 | 1.000 | 1.00 | 1.00 | 1.00 | 1.00 | 1.00 |
| $Al_2O_3$ | 0.26 | 0.280 | 0.237 | 0.35 | 0.30 | 0.26 | 0.60 | 0.40 |
| $SiO_2$ | 1.78 | 2.810 | 2.484 | 2.00 | 2.00 | 2.90 | 4.00 | 3.80 |
| $B_2O_3$ | — | 0.384 | 0.364 | — | — | — | 0.40 | — |

As the maturing temperature increases, it is usually noted that the number of oxides in the RO group is deacreased, more refractory oxides are used, and such combinations as $K_2O$—$Na_2O$ (sometimes written NaKO) are replaced by a single oxide. Feldspar is usually the principal flux, aided by ZnO, CaO and sometimes PbO.

HIGH-TEMPMERATURE GLAZES

In the following table are presented the oxide equivalents for representative glazes which mature in the range from Cone 12 through Cone 20, the latter being the conventional upper limit for firing of glazes.

Compositions of High Fusing Glazes - in Equivalents

| Component | Fusion temperature-cones | | | | |
| --- | --- | --- | --- | --- | --- |
|  | 12 | 14 | 16 | 18 | 20 |
| $K_2O$ | 0.20 | 0.30 | 0.15 | 0.25 | 0.30 |
| CaO | 0.40 | 0.70 | 0.65 | 0.60 | 0.70 |
| ZnO | 0.30 | — | — | — | — |
| BaO | 0.05 | — | — | 0.10 | — |
| MgO | 0.05 | — | 0.20 | 0.05 | — |
| Total RO | 1.00 | 1.00 | 1.00 | 1.00 | 1.00 |
| $Al_2O_3$ | 0.5 | 0.8 | 1.0 | 1.35 | 1.60 |
| $SiO_2$ | 4.0 | 8.0 | 10.0 | 14.00 | 16.00 |
| $B_2O_3$ | 0.0 | — | — | — | — |

All of the foregoing high temperature glazes are glossy, as their alumina-silica ratios are all 1:8 or higher. Mat glazes usually have much lower ratios.

We note that both PbO and $Na_2O$ have disappeared completely from the RO group; $K_2O$ and CaO are the principal fluxes. The $K_2O$ is usually introduced in potash feldspar, as the other potash compounds are soluble and therefore would require fritting of the glaze.

CRYSTALLINE GLAZES

Crystalline glazes are saturated with one or more crystal-forming ingredients at the fusing temperature, with the result that these ingredients crystallize as the glaze is slowly cooled. There are about 16 compounds that produce crystals under certain conditions. Of these, zinc oxide is by far the most widely used, and often amounts to 60% of the RO group. The crystals it produces are a complex zinc silicate. Manganese oxide is also often used.

Cryrstals may be produced in glazes of nearly every type and at practically all firing temperatures. However, glazes having the RO group composed of oxides with low atomic weights seem to be best. The use of soda rather than potash as the alkali aids in crystal growth. The size of crystals can be controlled by the growing time and their shape by the growing temperature. Best results are obtained when the glaze is brought to maturity, cooled as rapidly as possible to the crystallizing temperature, then held as long as desired at this temperature, and then slowly cooled. The glaze is usually applied in a coating somewhat thicker than is used for glossy non-crystalline glazes, and is fired in an oxidizing atmosphere. Mat Glazes Of greater commercial value than the crystalline glazes are those known as mat glazes, having a dull surface with low luster. Mat glazes also contain crystals, but they are so very small and so evenly distributed that no individual crystals are discernible to the unaided eye. Matness may be produced in a number of ways; the most foolproof mat glazes are those in which calcium silicate crystals are formed. The development of such crystals is enhanced by increasing the alumina content of the glaze; a ratio of about 1:2 for the oxygen content of the bases to that of the acids ($Al_2O_3$ is considered as a base) is recommended.

The mat effect is due to a diffusion of incident light from the many small crystal faces; the same effect may sometimes be obtained from an underfired glaze of the porcelain type. When glazes high in lime and alumina are used to produce a mat finish, anorthite ($CaO.Al_2O_3.6SiO_2$) is the principal mat-forming material.

High zinc or high barium contents may also be used to produce matness. In general, the more basic the glaze, the more quickly may it be cooled and still produce a mat finish. The barium mat and the lime-alumina mat normally develop smaller crystals than does the zinc mat, but in any case the crystals are well distributed throughout the glaze. Some very beautiful effects may be obtained in mat glazes, as the small crystals sometimes absorb the coloring oxides of the glaze, giving a pleasing two-tone effect.

PREPARATION OF GLAZES

After the glaze has been properly compounded and fritted, it must be incorporated into a water dispersion known as a "slip" for application to the ware. The glaze slip consists of a suspension in water of such non-plastic materials as ground frit, flint, and feldspar, plus a certain amount of plastic clays to maintain the other materials in suspension. Clay also controls the shrinkage of the glaze as it dries on the ware, and improves adhesion to the body before the glaze is fired. For these reasons, a glaze is usually compounded so as to contain about 10% clay; significantly larger amounts would cause cracking of the dry glaze.

Glazes are ground in ball or jar mills, with the time of grinding controlled by periodic screen tests used to determine the average particle size. The actual fineness varies considerably with the type of body and glaze and method of glaze application to be used. In any event, the glaze is ground rather fine, so that all will usually pass through at least a 100-mesh screen. After the grinding, the slip may be passed over magnetic separators prior to being adjusted to the proper consistency for dipping or spraying, as required.

GLAZE APPLICATION

The glaze may be applied on either fired or raw bisque ware by a variety of methods, chief among which are spraying, dipping, hand painting, banding, dusting, and flow coating. Dipping and spraying are the more preferred methods.

EXAMPLES

Test specimens were prepared to simulate the defects which are often present in commercially produced sanitaryware.

The ceramic slip contained the following ingredients, all quantities being expressed in parts by weight.

|  | Parts |
| --- | --- |
| Soda Feldspar | 34.6 |
| Flint(Silica) | 21.0 |
| Georgia Kaolin | 37.4 |
| Tennessee Ball Clay | 7.0 |
| Sodium Silicate | 0.6 |
| Water | 40.0 |

A mixture of the kaolin and ball clay was gradually added to a stirred solution of the sodium silicate in water. The rate of addition was slow enough that all of the solid material was saturated, i.e., wetted, upon coming in contact with the sodium silicate solution. The feldspar and flint were then added to the resultant dispersion, which was then stirred for 2 hours to ensure a homogeneity. The slip was then poured into rectangular plaster of paris molds of 3 different sizes. The inner dimensions of the 3 moles were 2 × 4 × ½ inches (5×10×1cm.), 5×8×5/8 inches (13×20×1.6cm.) and 4-¼×4-¼×⅝ inches (11×11×1.6cm.). The test specimens remained in the mold for about six hours, at which time they were sufficiently coherent to be handled without crumbling. The residence time varied depending upon the dimensions of the mold cavity and the amount of water initially present in the plaster of paris slabs which formed the mold. Following removal from the mold one surface of each test specimen was scored three times to a depth of 0.063 inch (1.56 cm.) using a razor blade. The score lines were about 1 inch (2.5 cm.) apart and extended between opposite edges of the sample. The test specimens were then allowed to air dry under ambient conditions for about 16 hours, after which they were placed in an oven heated to a temperature of 200°F. to remove substantially all of the remaining water. The specimen remained in the oven for two hours.

The glaze was prepared by placing the raw materials in a one gallon capacity ball mill jar which has half filled with porcelain balls measuring 1 inch (2.5 cm.) in diameter. The jar was then sealed and rolled for one hour at 57 revolutions per minute using a conventional roller mill, after which the resultantn dispersion was poured through a 200 mesh wire screen into a suitable container in which it was stored until ready for use. The following raw materials were employed to prepare the glaze:

|  | Parts by Weight |
| --- | --- |
| Nepheline Syenite | 7.8 |
| Flint | 27.2 |
| Feldspar | 26.2 |
| Kaolin Clay | 6.8 |
| Wollastonite | 16.8 |
| Zinc Oxide | 0.5 |
| Talc | 3.0 |
| Barium Carbonate | 2.4 |
| Zirconium Silicate | 9.0 |
| Surfactant(as specified in Table I) | 0.3 |
| Total Solids | 100.0 |
| Water | 45 |
| Cellulose Gum (0.24%, based on weight of water) |  |

The glaze dispersion was sprayed onto the scored surface of the rectangular test specimens to obtain a concentration of glaze equal to 0.89 g. per square inch of glazed surface, which was equivalent to a glaze thickness of 0.015 inch (0.038 cm.) following firing. The coated test samples were placed in an electrically heated firing kiln on heat resistant racks which allowed the specimens to be oriented with the major surfaces in a horizontal position, one above the other, yet provided sufficient spacing between specimens to permit uniform heating during firing. The temperature in the kiln was gradually raised from ambient to 2200°F. (1204°C.) which is equivalent to cone 11, at which time the electric power to the kiln was cut off and the temperature in the kiln allowed to decrease. The extent to which the score lines in the specimen had been coated with glaze was measured, and is expressed in terms of % defect coverage in Table I. Each of the surfactants tested is represented by an integer in accordance with the following definitions.

1. The sodium sulfate derivative is of 2-ethyl-1-hexanol.
2. A sodium alkylnaphthalene sulfonate available as Alkanol BG from E.I. DuPont de Nemours and Co.
3. A straight chain tridecylbenzene sodium sulfonate available as Conoco C-650 from the Continental Oil Company.
4. Reaction product of cocoamines (derived from coconut oil) with ethylene oxide in a 1:5 molar ratio.

5. Polypropoxylated methyl diethyl ammonium chloride.
6. Polyoxyethylene monososrbitan monooleate.
7. A fatty acid amide available under the trade name Ecconol GGL from Essential Chemicals Corporation, Merton, Wisconsin.
8. A sulfonated amide derived from fatty acids, imidazoline and aliphatic amines available under the trade name "Sandopan TFL" from Sandoz Color and Chemical.
9. A mixture of ethoxylated mono- and dioctyl phosphates.

All of the foregoing surfactants were employed at a concentration of 0.1%, based on the weight of the glaze formulation.

TABLE I

| Surfactant No. | % defect coverage by glaze |
|---|---|
| None (control) | 20% |
| 1 | 100 |
| 2 | 100 |
| 3 | 100 |
| 4 | 100 |
| 5 | 30 |
| 6 | 100 |
| 7 | 60 |
| 8 | 100 |
| 9 | 100 |

All of the surfactants tested improved defect coverage. In the majority of instances the glaze completely covered the score lines.

The glaze compositions of this invention can be applied to a variety of fired or unfired ceramic articles which are grouped under the category of clayware, which includes whitewares, bricks, structural tiles, and ceramic materials employed in the manufacture of electrical and electronic components. The articles are prepared using aqueous dispersions of kaolin, ball clay, bentonite, flint and feldspar in addition to other oxides and silicates in various proportions depending upon firing conditions and the desired properties of the fired article. Compositions of representative types of ceramic articles and methods for preparing them are extensively discussed in the ceramic literature and are therefore well known to those skilled in the art. A thorough presentation of this subject matter can be found in various texts, including "Ceramic Whitewares" by R. Newcomb, Jr. (Pitman Publishing Company, New York, 1947). The specific glaze composition disclosed in the foregoing example is preferred for use on sanitary ware, a designation applied to articles employed for water supply, waste disposal and general sanitation, such as sinks, however the present surfactants will improve the defect coverage of glazes on virtually all types of ceramic substrates.

What is claimed is:

1. In a glazing composition for ceramic substrates, said glazing composition consisting essentially of an aqueous dispersion wherein the solid phase contains silica, kaolin and at least one member of the group consisting of water-insoluble silicates, aluminosilicates and oxides of boron, potassium, sodium, calcium, aluminum, barium, strontium, magnesium, lead, zinc and zirconium and heat-reactive precursors of said silicates, aluminosilicates and oxidies, the improvement of adding between 0.01 and 10%, based on the weight of said glazing composition, of a water-soluble material selected from the group consisting of ionic and non-ionic surfactants in order to improve resistance to crawling.

2. The glazing composition of claim 1 wherein the surfactant is selected from the group consisting of sulfated alcohols, alkane sulfonic acids, alkyl aryl sulfonates, amine salts, quaternnary ammonium compounds, polyethoxylated esters of sorbitan, sulfonated amides and ethylene oxide condensation products.

* * * * *